(12) United States Patent
Noel et al.

(10) Patent No.: US 11,618,288 B2
(45) Date of Patent: Apr. 4, 2023

(54) METHOD FOR MANUFACTURING A PATCH EQUIPPED WITH A RADIOFREQUENCY TRANSPONDER

(71) Applicant: COMPAGNIE GENERALE DES ETABLISSEMENTS MICHELIN, Clermont-Ferrand (FR)

(72) Inventors: Sebastien Noel, Clermont-Ferrand (FR); Jean-Mathieu Clergeat, Clermont-Ferrand (FR); Isabelle Aldon, Clermont-Ferrand (FR); Jean-Claude Delorme, Clermont-Ferrand (FR); Ronald Cress, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 826 days.

(21) Appl. No.: 16/466,378

(22) PCT Filed: Nov. 30, 2017

(86) PCT No.: PCT/FR2017/053319
§ 371 (c)(1),
(2) Date: Jun. 4, 2019

(87) PCT Pub. No.: WO2018/104621
PCT Pub. Date: Jun. 14, 2018

(65) Prior Publication Data
US 2020/0070598 A1 Mar. 5, 2020

(30) Foreign Application Priority Data
Dec. 5, 2016 (FR) ........................ 1661926

(51) Int. Cl.
*B29C 45/16* (2006.01)
*B60C 23/04* (2006.01)
(Continued)

(52) U.S. Cl.
CPC ........ *B60C 23/0493* (2013.01); *B29C 33/424* (2013.01); *B29C 37/0057* (2013.01);
(Continued)

(58) Field of Classification Search
CPC ................ B29C 39/10; B29C 45/1671; B29C 2045/1673
See application file for complete search history.

(56) References Cited

U.S. PATENT DOCUMENTS

| 5,196,845 A | 3/1993 | Myatt |
| 6,326,925 B1 | 12/2001 | Perkio et al. |

(Continued)

FOREIGN PATENT DOCUMENTS

| CN | 1448284 A | 10/2003 |
| CN | 1953881 A | 4/2007 |

(Continued)

OTHER PUBLICATIONS

International Search Report dated Feb. 8, 2018, in corresponding PCT/FR2017/053319 (4 pages).

*Primary Examiner* — Edmund H Lee
(74) *Attorney, Agent, or Firm* — Venable LLP

(57) ABSTRACT

A process for manufacturing a rubber patch comprising a radiofrequency transponder, the patch having a first layer and a second layer, the method comprising moulding and vulcanizing a first layer, the exterior surface of which comprises a cavity able to receive a radiofrequency transponder, placing a transponder in the cavity, and then placing and vulcanizing a second layer in order to embed the transponder between the two layers.

13 Claims, 6 Drawing Sheets

(51) Int. Cl.
  *B29D 30/00* (2006.01)
  *H01Q 1/22* (2006.01)
  *B29C 39/02* (2006.01)
  *B29C 33/42* (2006.01)
  *B29C 37/00* (2006.01)
  *B29C 39/00* (2006.01)
  *B29C 39/10* (2006.01)
  *B29C 45/00* (2006.01)
  *B29C 45/14* (2006.01)
  *B29K 9/00* (2006.01)
  *B29K 105/00* (2006.01)
  *B29K 105/24* (2006.01)

(52) U.S. Cl.
  CPC .......... *B29C 39/003* (2013.01); *B29C 39/025* (2013.01); *B29C 39/10* (2013.01); *B29C 45/0001* (2013.01); *B29C 45/14819* (2013.01); *B29C 45/1671* (2013.01); *B29D 30/0061* (2013.01); *B60C 23/0452* (2013.01); *H01Q 1/2241* (2013.01); *B29C 2045/14852* (2013.01); *B29C 2045/1673* (2013.01); *B29D 2030/0077* (2013.01); *B29K 2009/00* (2013.01); *B29K 2105/0088* (2013.01); *B29K 2105/24* (2013.01); *B29K 2995/0003* (2013.01)

(56) References Cited

U.S. PATENT DOCUMENTS

| | | |
|---|---|---|
| 6,546,982 B1 | 4/2003 | Brown et al. |
| 6,687,131 B1 * | 2/2004 | Miehling ......... G06K 19/07779 174/521 |
| 6,772,505 B1 | 8/2004 | Logan et al. |
| 6,836,253 B2 | 12/2004 | Strache et al. |
| 6,899,153 B1 | 5/2005 | Pollack et al. |
| 6,991,013 B2 | 1/2006 | Poulbot et al. |
| 7,084,750 B2 | 8/2006 | Johanning et al. |
| 7,102,499 B2 | 9/2006 | Myatt |
| 7,391,307 B2 | 6/2008 | Kuwajima |
| 7,453,407 B2 | 11/2008 | Logan et al. |
| 8,319,659 B2 | 11/2012 | Buck et al. |
| 8,593,357 B2 | 11/2013 | Myatt |
| 9,070,069 B2 | 6/2015 | Sinnett |
| 9,114,671 B2 | 8/2015 | Adamson et al. |
| 9,679,174 B2 | 6/2017 | Destraves et al. |
| 9,754,138 B2 | 9/2017 | Destraves et al. |
| 10,339,435 B2 | 7/2019 | Destraves |
| 11,018,406 B2 | 5/2021 | Destraves et al. |
| 11,152,684 B2 | 10/2021 | Destraves et al. |
| 11,264,698 B2 | 3/2022 | Destraves et al. |
| 11,295,193 B2 | 4/2022 | Destraves et al. |
| 2003/0085619 A1 | 5/2003 | Strache et al. |
| 2003/0217797 A1 | 11/2003 | Poulbot et al. |
| 2004/0252072 A1 | 12/2004 | Adamson et al. |
| 2006/0208863 A1 | 9/2006 | Kuwajima |
| 2007/0103285 A1 | 5/2007 | Konno et al. |
| 2007/0227644 A1 | 10/2007 | Fagot-Revurat et al. |
| 2008/0289736 A1 | 11/2008 | Adamson et al. |
| 2009/0058625 A1 | 3/2009 | Suzuki et al. |
| 2010/0122757 A1 | 5/2010 | Lionetti et al. |
| 2010/0123584 A1 | 5/2010 | Lionetti et al. |
| 2010/0176969 A1 | 7/2010 | Buck et al. |
| 2011/0175778 A1 | 7/2011 | Myatt |
| 2012/0291936 A1 | 11/2012 | Lionetti et al. |
| 2013/0153669 A1 | 6/2013 | Sinnett |
| 2015/0217602 A1 | 8/2015 | Salgues et al. |
| 2015/0239301 A1 | 8/2015 | Vallet et al. |
| 2016/0107490 A1 | 4/2016 | Randall et al. |
| 2016/0176247 A1 | 6/2016 | Cheikh et al. |
| 2017/0341323 A1 | 11/2017 | Destraves et al. |
| 2018/0174015 A1 * | 6/2018 | Destraves ............... B60C 19/00 |
| 2018/0264898 A1 | 9/2018 | Lallement et al. |
| 2019/0322142 A1 | 10/2019 | Lallement |
| 2019/0341673 A1 | 11/2019 | Destraves |
| 2020/0062050 A1 | 2/2020 | Destraves |
| 2020/0067171 A1 | 2/2020 | Destraves |
| 2020/0079159 A1 | 3/2020 | Destraves |
| 2020/0247193 A1 | 8/2020 | Nakajima et al. |

FOREIGN PATENT DOCUMENTS

| | | | |
|---|---|---|---|
| CN | 101279574 A | | 10/2008 |
| CN | 101734112 A | | 6/2010 |
| CN | 101801692 A | | 8/2010 |
| CN | 103068598 A | | 4/2013 |
| DE | 19962077 | * | 6/2001 |
| DE | 10 2007 043 077 A1 | | 3/2009 |
| EP | 1115087 | * | 9/2002 |
| EP | 1310386 A2 | | 5/2003 |
| EP | 1619052 A1 | | 1/2006 |
| EP | 1977912 A1 | | 10/2008 |
| EP | 2 524 818 A2 | | 11/2012 |
| FR | 2936185 A1 | | 3/2010 |
| JP | 2010-176454 A | | 8/2010 |
| JP | 2011-195046 A | | 10/2011 |
| JP | 2016-37236 A | | 3/2016 |
| JP | 2016-49920 A | | 4/2016 |
| WO | 2005/113262 A1 | | 12/2005 |
| WO | 2012/030321 A1 | | 3/2012 |
| WO | 2014/049058 A1 | | 4/2014 |
| WO | 2016/193457 A1 | | 12/2016 |

* cited by examiner

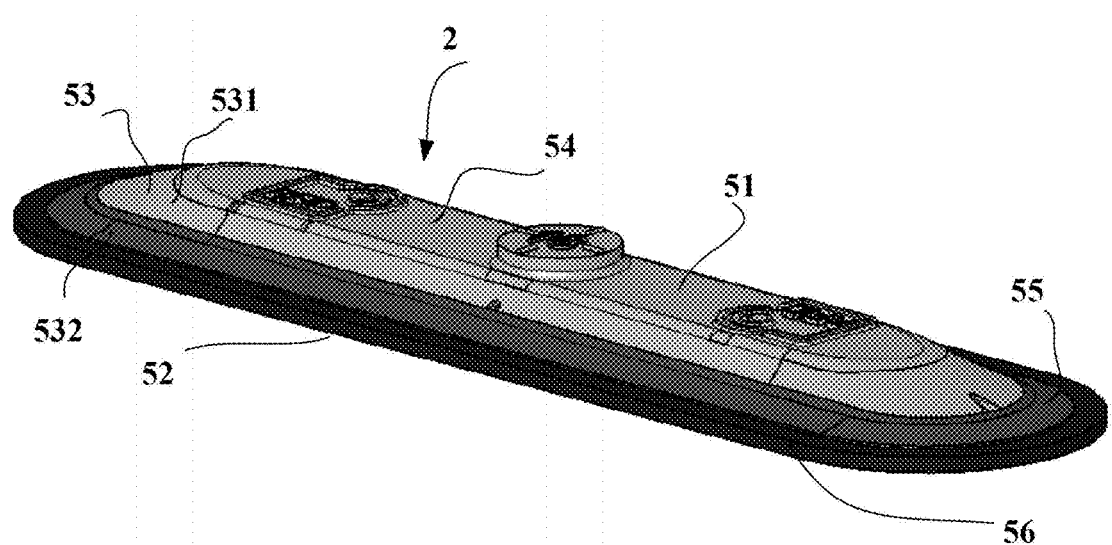
Fig.1
Fig. 11
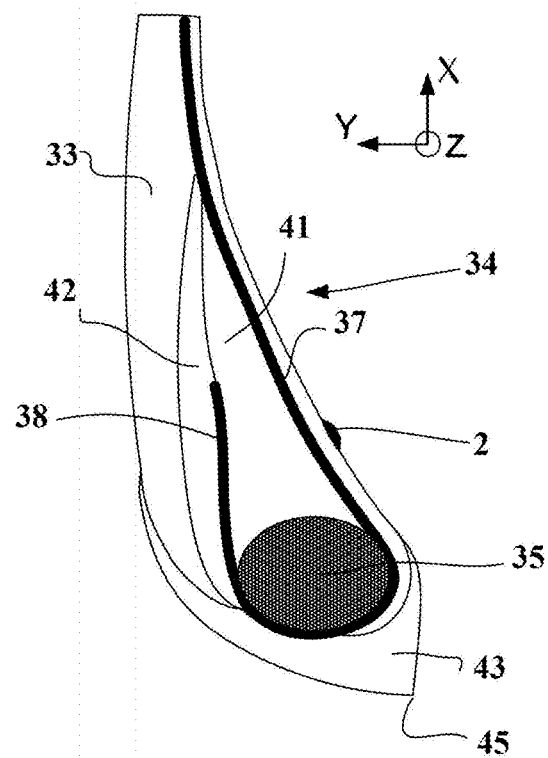

TELECOMMUNICATIONS

- PRODUCTION OF HELICAL SPRING
- RADIATING ANTENNA: CUTTING OF THE SPRING TO ONE HALF-WAVELENGTH

ELECTRONICS

- CONNECTION OF ELECTRONIC CHIP AND PRINTED CIRCUIT BOARD
- PRODUCTION OF PRIMARY ANTENNA
- CONNECTION OF PRIMARY ANTENNA AND ELECTRONIC BOARD
- ELECTRONIC PORTION: ENCAPSULATION OF ELECTRONIC BOARD IN A RIGID AND ELECTRICALLY INSULATING MATERIAL

ASSEMBLY

- PRODUCTION OF RADIOFREQUENCY TRANSPONDER: ASSOCIATION OF RADIATING ANTENNA AND ELECTRONIC PORTION
- PRODUCTION OF COMMUNICATION MODULE: INSERTION OF RADIOFREQUENCY TRANSPONDER INTO A SUPPLE AND INSULATING ELASTOMER

FIG. 9

METHOD FOR MANUFACTURING A PATCH EQUIPPED WITH A RADIOFREQUENCY TRANSPONDER

FIELD OF THE INVENTION

The present invention relates to rubber patches equipped with a radiofrequency transponder, intended to be fastened to the wall of a tyre, and more particularly to a process for manufacturing such a rubber patch.

PRIOR ART

It is advantageous to equip tyres with electronic identification devices that allow them to be identified and tracked during their manufacture, storage, throughout their lifetime and also retreading thereof.

The tyres in question are tyres of all types for heavy goods vehicles, tourers, construction equipment, agricultural machinery, and aeroplanes.

Such electrical devices may be radiofrequency transponders or radio-frequency identification (RFID) tags.

These electronic devices must be placed very precisely in order to guarantee good radio communication, an acceptable device lifetime and in order not to penalize the operation or the endurance of the tyres.

Document JP2010/176454A discloses a process for obtaining a radiofrequency transponder patch. However, the drawback of such a process is that bubbles are generated in the interior of the patch, weakening it mechanically. The objective of the invention thus aims to find a technical alternative to this drawback.

BRIEF DESCRIPTION OF THE INVENTION

One subject of the invention is a process for manufacturing a rubber patch comprising a radiofrequency transponder, the patch having a first layer and a second layer, comprising the following steps:
  choosing a first mould the impression of which has a geometry adapted to the geometry of the first layer of the patch and that defines on the surface of the first layer a cavity able to receive the transponder;
  placing the rubber material forming the first layer of the patch in the impression of the first mould;
  raising the first mould to a temperature and for a time suitable for obtaining a vulcanized first layer with on its exterior surface a cavity able to receive a radiofrequency transponder;
  choosing a second mould the impression of which has a geometry adapted to the geometry of the patch;
  placing the vulcanized first layer in the impression of the second mould;
  placing the radiofrequency transponder in the cavity of the surface of the vulcanized first layer provided to this end;
  placing the non-vulcanized rubber second layer in the internal cavity of the second mould;
  raising the second mould to a temperature and for a time suitable for obtaining an at least partially vulcanized rubber second layer; and
  removing from the second mould the rubber patch comprising the radiofrequency transponder embedded between the first and second rubber layers.

The production of this rubber patch in two operations allows the radio frequency transponder to be placed in the patch with a high precision and reproducibly. It is thus possible to place it optimally and reproducibly on the wall of a tyre.

Preferably, the impression of the first mould comprises at least one rib in order to create in the surface of the first layer between the cavity able to receive a radiofrequency transponder and the exterior end of said surface a groove.

This groove placed facing a vent of the mould allows air to be evacuated from between the two rubber blends during the introduction of the second layer into the second mould or the closure of this second mould and thus bubbling defects in the final patch to be avoided.

Preferably, the impression of the first mould comprises four ribs in order to create in the surface of said first layer between the cavity able to receive a radiofrequency transponder and the exterior end of said surface four grooves extending the length and width of the surface of the first layer.

These four grooves placed facing four vents of the mould allow, as indicated above, an optimized evacuation of air.

The material from which the first layer is made may be a rubber blend based on unsaturated or saturated diene elastomers such as butyl, SBR, polybutadiene, natural rubber, polyisoprene. The advantage of butyl is that it has an excellent resistance to oxidation. It is also possible to use as elastomer an EPDM (ethylene propylene diene monomer rubber).

According to one advantageous embodiment, after the vulcanized first layer has been placed in the impression of the second mould and before the non-vulcanized rubber second layer is placed in the impression of the second mould, the surface of the vulcanized first layer is prepared.

This surface may be prepared by applying a film of solvent or by a plasma treatment or by removing an interlayer placed on the surface of the first layer before the vulcanization thereof.

According to another embodiment, after the vulcanized first layer has been obtained, this vulcanized first layer is placed in the impression of the second mould and the non-vulcanized rubber second layer is placed in the internal cavity of the second mould in a short time preferably shorter than one hour.

The rubber materials of the first and second layers may be formed by injection moulding.

They may also be formed by over moulding.

Advantageously, after the vulcanized patch has been demoulded from the second mould, a layer of non-vulcanized bonding rubber is added to the exterior surface of the second layer.

The objective of this layer of bonding rubber is to ensure the link with the surface of the tyre.

It is also possible to use an adhesive layer based on polyurethane, silicone, cyanoacrylate, or silanized polyether.

The advantage of an adhesive layer made of silanized polyether is that it allows a very wide temperature range of use to be achieved, i.e. one that covers both high and low temperatures.

The radiofrequency transponders usually comprise an electronic chip and a radiating antenna able to communicate with a radiofrequency reader.

In particular, the communication frequency of the radiofrequency transponder is located in the ultra-high-frequency (UHF) band comprised between 300 MHz and 3 GHz, allowing an advantageous compromise to be obtained between the size of the radiating antenna, which may be small, allowing the antenna to be easily integrated into a rubber patch intended for a tyre casing, and the distance from which the radiofrequency transponder is readable, this distance possibly being far from the tyre casing. Advantageously, the radiofrequency transponder communicates in the narrow frequency band comprised between 860 MHz and 960 MHz and more specifically in the very narrow bands of 860 MHz to 870 MHz and 915 MHz to 925 MHz. Specifically, at these frequencies, for the conventional elastomer blends of tyre casings a good compromise is reached with respect to propagation of the electromagnetic waves. In addition, these frequencies are the highest possible in order to minimize the size of the radiating antenna and thus facilitate integration of the radio-frequency transponder embedded in a rubber patch into the tyre casing.

According to a first embodiment, the radiating antenna comprising two helical antenna segments, and the electronic chip is galvanically connected to the two helical antenna segments.

According to another embodiment, the radiofrequency transponder in addition comprises a primary antenna electrically connected to the electronic chip, wherein the primary antenna is inductively coupled to the radiating antenna, and wherein the radiating antenna is a dipole antenna consisting of a single-strand helical spring.

This second embodiment has the advantage of mechanically disassociating the radiating antenna from the electronic components of the transponder and thus of avoiding the weak point of conventional transponders, namely the zone in which the antenna segments are fastened to the carrier of the electronic chip.

Another subject of the invention is a tyre comprising a crown, two beads and two sidewalls, and a carcass ply anchored to said two beads, such that a patch according to one of the subjects of the invention is fastened to one of the walls thereof.

According to one preferred embodiment, the axis of the radiating antenna of the rubber patch is oriented normally to the reinforcers of the carcass ply.

According to one embodiment, the rubber patch may be fastened to a sidewall of the tyre. Thus, there is no need to place it in immediate proximity to the guide rib or the middle of the sidewall of the tyre, it being possible to place it above or below the guide rib.

According to another embodiment, the rubber patch may be fastened to the surface of the interior layer of the tyre.

The tyre comprising a radially interior end on the side of the internal cavity, which end is referred to as the bead toe, the rubber patch is advantageously entirely placed in a zone the curvilinear abscissa of which is greater than 60 mm and preferably comprised between 70 and 110 mm from this bead toe.

Such a rubber patch equipped with a radiofrequency transponder may be installed at any moment during the lifetime of the tyre from its manufacture to the retreading thereof.

DESCRIPTION OF THE FIGURES

The various subjects of the present invention will be better understood by means of the following detailed description and the attached drawings, the same reference numbers having been used in all the drawings to reference identical parts, and in which drawings:

FIG. 1 is a perspective view of a patch according one of the subjects of the invention;

FIG. 9 is an overview of a process for manufacturing an identification patch comprising a radiofrequency transponder according to the invention;

FIG. 11 illustrates in partial axial cross section a tyre bead comprising a radiofrequency module fastened by adhesive bonding to its internal wall.

DETAILED DESCRIPTION OF THE INVENTION

Figure 2:
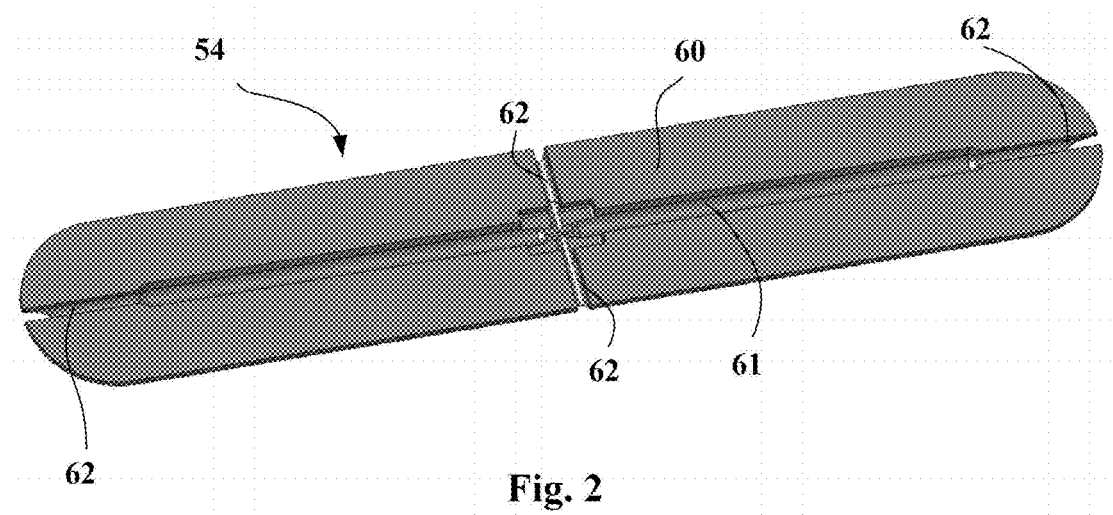
FIG. 2 is a top view of the surface of the vulcanized first layer showing the cavity for receiving the radiofrequency transponder.

FIG. 1 is a perspective view of a patch 2 according to the invention.

This patch is of elongate shape and has a substantially planar upper surface 51, a substantially planar lower surface 52 intended to be fastened to the wall of a tyre, and a skirt 53 connecting the exterior outlines of the upper and lower surfaces. The profiles of the skirt 53 in any normal cross section are inclined relative to the direction of the lower surface by an angle of about 9 to 15° in order to guarantee a good mechanical attachment of the patch to the wall of the tyre.

It may be seen in FIG. 1 that this patch 2 is composed of three main portions. A first layer 54 that comprises the upper surface 51 and the exterior portion 531 of the skirt 53, a second layer 55 that comprises the lower portion 532 of the skirt 53 and a layer 56 of a cold-vulcanizing bonding rubber such as Gray gum sold by Tech International. This bonding-rubber layer has a thickness of about 1 mm.

The materials of the first and second layers are preferably electrically insulating and have a dielectric constant at 915 MHz of below 6.5.

The elastomer blends of the first and second layers encapsulating the transponder contain 100 phr (parts per 100 parts elastomer by mass) of a polymer such as EPDM (ethylene propylene diene monomer rubber), butyl rubber, neoprene or a diene elastomer such as SBR (styrene-butadiene rubber), polybutadiene, natural rubber or polyisoprene.

The blends may contain fillers such as fillers of silica, carbon-black, chalk and kaolin type:
  with filler of silica type in a maximum amount of 50 phr;
  with a filler of the type consisting of carbon black of ASTM grade higher than 700, in an amount lower than 50 phr;

with a filler of the type consisting of carbon black of grade lower than or equal to 500, in a maximum amount of 20 phr.

It is possible to add or replace these fillers with chalk or kaolin.

Such amounts and types of fillers make it possible to guarantee a relative permittivity lower than 6.5, in particular at a frequency of 915 MHz.

The stiffness in the cured state of the blends used to encapsulate the transponder is preferably lower than or close to that of the adjacent blends of the wall of the tyres to which the patch is intended to be fastened.

FIG. 2 illustrates a top view of the first layer 54 such as it is on leaving the first manufacturing mould. This view shows the surface 60 for bonding with the second layer 55. This surface comprises a cavity 61 intended to receive the radiofrequency transponder 1. It also comprises four grooves 62 placed between the cavity 61 and the exterior of the outline of the surface 60. These grooves are intended to facilitate evacuation of air when the rubber blend of the second layer is placed in or injected into the impression of the second mould. These four grooves are each located facing a vent of the second mould. This allows the presence of bubbles in the patch 2 after complete vulcanization to be avoided.

Figure 3:
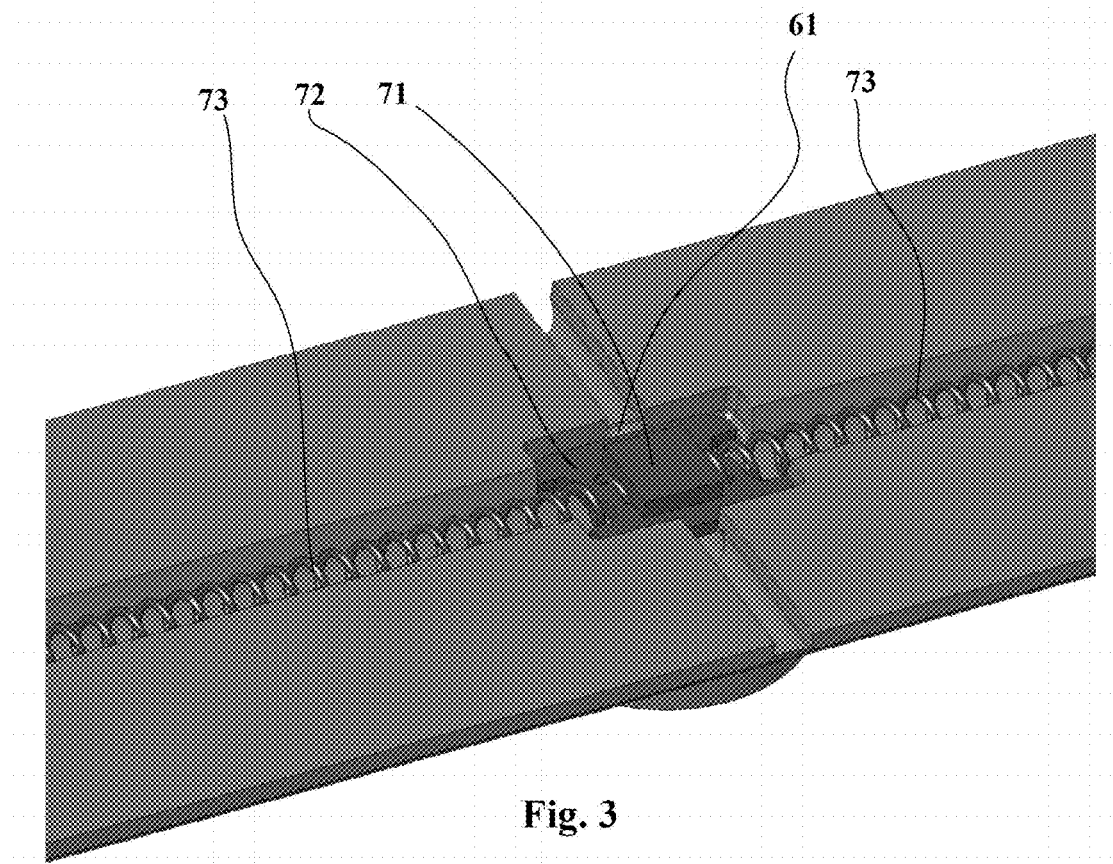
FIG. 3 is an enlargement of FIG. 2 with a transponder inserted into the cavity provided for this purpose.

FIG. 3 is an enlargement of the central portion of FIG. 2. This figure shows the presence of a conventional radiofrequency transponder, such as described in document WO 2012/030321 A1. This transponder comprises an electronic chip 71 fastened to a carrier or printed circuit board (PCB) 72 and galvanically connected to two half-antennas 73. The antennas are helical springs the solid core of which is steel wire.

The cavity 61 is suitable for receiving the radiofrequency transponder and positioning it very precisely. Therefore, after complete vulcanization of the patch, the position of this transponder is very precisely known.

FIGS. 4 to 7 show another embodiment of a radiofrequency transponder.

Figure 4:
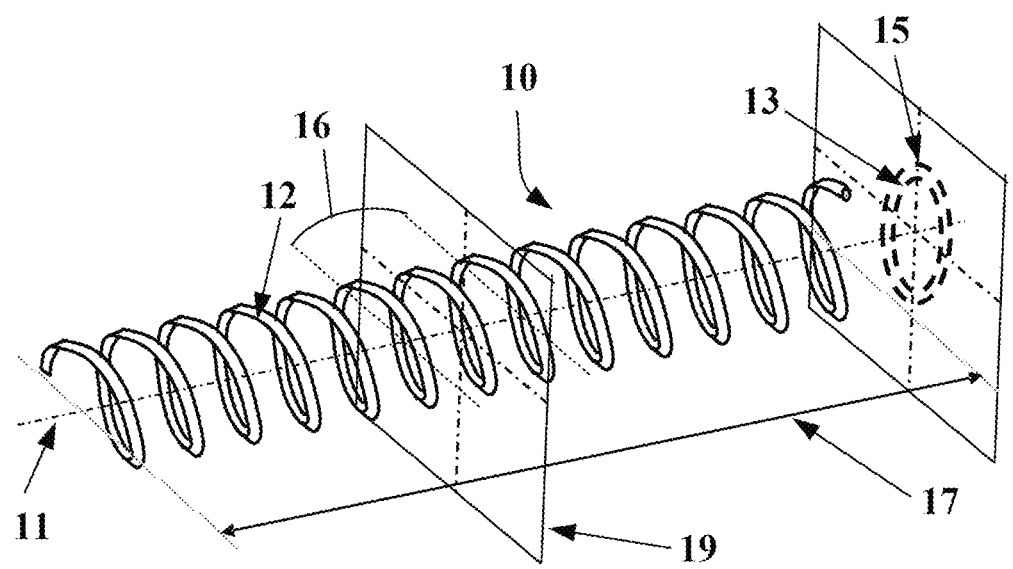
FIG. 4 is a detail view of a radiating antenna of a radiofrequency transponder according to the invention.

FIG. 4 shows a radiating antenna 10 consisting of a steel wire 12 that has been plastically deformed in order to form a helical spring having an axis of revolution 11. This steel wire is coated with a conduction layer made of copper, aluminium, silver, gold, copper, tin, zinc or brass covered if necessary with a chemically insulating layer for example made of brass, zinc, nickel or tin in order to protect the rubber blend from the material of the conduction layer.

The electromagnetic conduction of such an antenna occurs mainly via a skin effect, i.e. it mainly occurs in the exterior layers of the antenna. The thickness of this skin is in particular dependent on the frequency of the radiation and on the material from which the conduction layer is made. By way of example, for a UHF frequency (for example 915 MHz), the skin thickness is about 2.1 µm for silver, 2.2 µm for copper, and 4.4 µm for brass.

The steel wire may be coated with these layers then formed; alternatively it may also be formed then coated.

The helical spring is primarily defined by a winding diameter of the coated wire and by a helix pitch. Thus, given the diameter of the wire, the inside diameter 13 and outside diameter 15 of the helical spring may be precisely determined. The length of the spring 17 here corresponds to one half-wavelength of the transmission signal of the radiofrequency transponder 1 in a rubber mass. It is furthermore possible to define a median plane 19 of the helical spring perpendicular to the axis of revolution 11 separating the radiating antenna into two equal portions. This plane is in the middle of a central zone 16 of the radiating antenna, this central zone 16 corresponding to about 25% of the total length of the antenna and preferably 15%.

Figure 5:
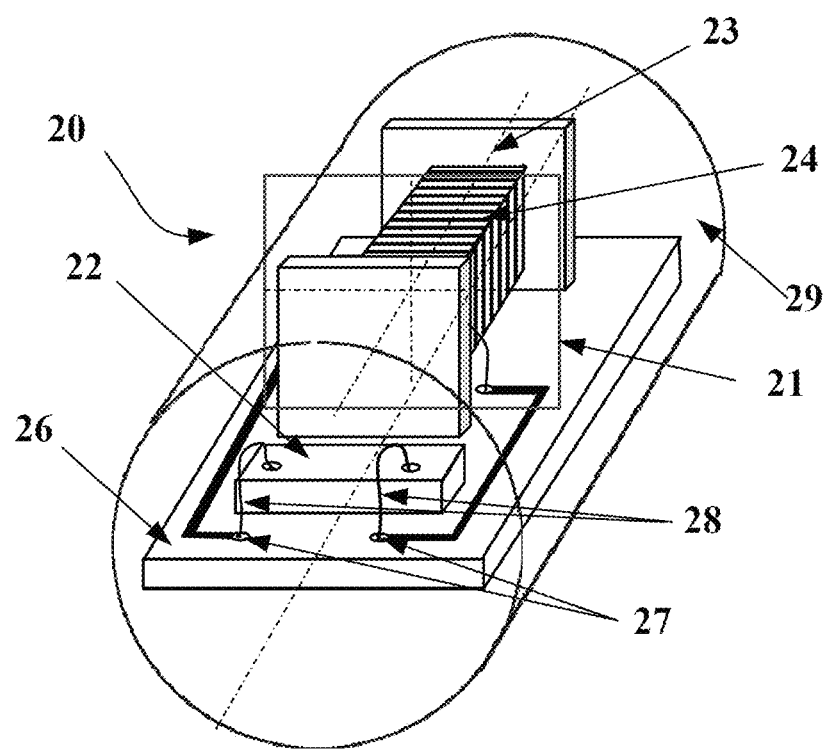
FIG. 5 is a perspective view of the electronic portion of a radio frequency transponder in a configuration in which the electronic portion is located in the interior of the radiating antenna.

FIG. 5 shows the electronic portion 20 of a radiofrequency transponder 1 intended for a configuration in which the electronic portion 20 is located in the interior of the radiating antenna 10. The electronic portion 20 comprises an electronic chip 22 and a primary antenna 24 that is electrically connected to the electronic chip 22 via a printed circuit board 26. The primary antenna here consists of a surface-mount-device (SMD) microcoil having an axis of symmetry 23. The median plane 21 of the primary antenna is defined by a normal parallel to the axis of symmetry 23 of the SMD coil and separates the coil into two equal portions. The components on the printed circuit board are electrically connected using tracks made of copper terminated by copper pads 27. The components on the printed circuit board are electrically connected using the wire-bonding technique by gold wires 28 running between the component and the pads 27. The assembly consisting of the printed circuit board 26, the electronic chip 22 and of the primary antenna 24 is embedded in a rigid mass 29 made of electrically insulating high-temperature epoxy resin, and forms the electronic portion 20 of the radiofrequency transponder 1.

Figure 6:
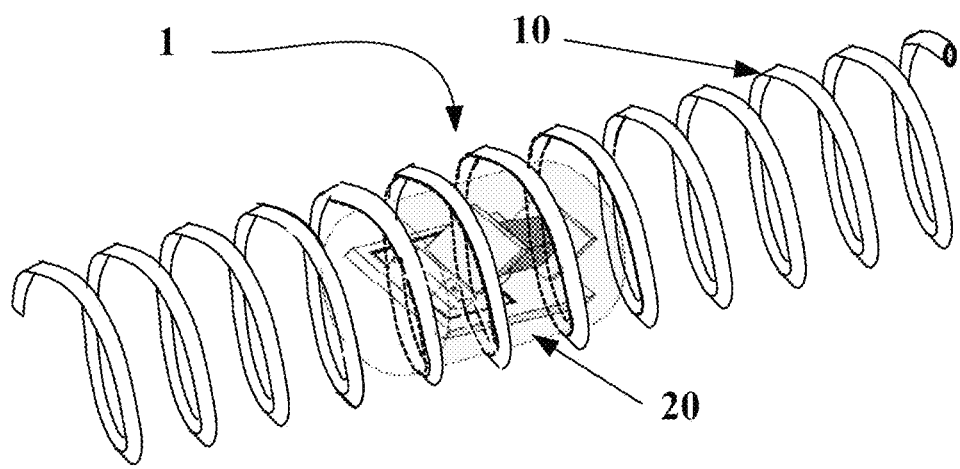
FIG. 6 is a perspective view of a radio frequency transponder according to the invention in a configuration in which the electronic portion is located in the interior of the radiating antenna.

FIG. 6 shows a radiofrequency transponder 1 in a configuration in which the electronic portion 20 is located in the interior of the radiating antenna 10. The geometric shape of the electronic portion 10 is circumscribed in a cylinder the diameter of which is smaller than or equal to the inside diameter 13 of the helical spring. The introduction of the electronic portion 20 into the radiating antenna 10 is facilitated thereby. The median plane 21 of the primary antenna is located in the central zone of the radiating antenna and substantially superposed on the median plane 19 of the radiating antenna 10.

Figure 7:
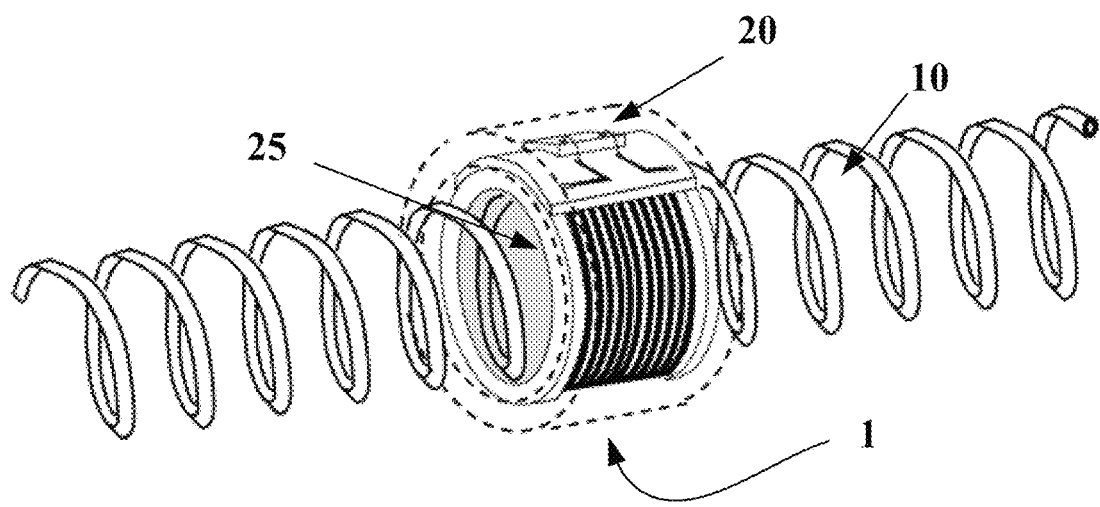
FIG. 7 is a perspective view of a radio frequency transponder according to the invention in a configuration in which the electronic portion is located on the exterior of the radiating antenna.

FIG. 7 shows a radiofrequency transponder 1 in a configuration in which the electronic portion 20 is located on the exterior of the radiating antenna 10. The geometric shape of the electronic portion 20 has a cylindrical cavity 25 the diameter of which is larger than or equal to the outside diameter 15 of the radiating antenna 10. The introduction of the radiating antenna 10 into the cylindrical cavity 25 of the electronic portion is thus facilitated thereby. The median plane 21 of the primary antenna is located in the central zone of the radiating antenna and substantially in line with the median plane 19 of the radiating antenna 10.

Figure 8:
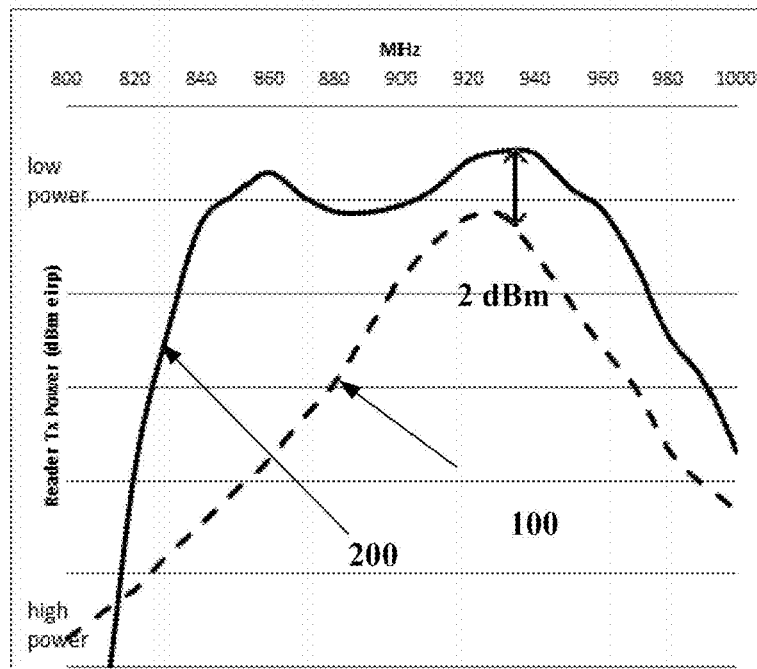
FIG. 8 is a comparison of the threshold of activation of UHF RFID tags located in the interior of a tyre.

FIG. 8 is a graph of the electrical power transmitted to a radiofrequency reader by a radiofrequency transponder located in the interior of a Michelin tyre of the XINCITY trademark and of 275/70 R22.5 dimensions. The measurement protocol employed corresponds to that of standard ISO/IEC 18046-3 entitled "Identification Electromagnetic Field Threshold and Frequency Peaks". Measurements were carried out at a wide range of scanned frequencies and not at a single frequency as conventionally is the case. The ordinate axis represents the frequency of the communication signal. The abscissa axis is the electromagnetic power radiated by the reader and its antenna, expressed in decibel-milliwatts (dBm), that allowed the chip to be turned on, i.e. its activation threshold, and therefore a response to be received from the tag. The reader is such as described in the prior art and the reference RFID tag such as described in document WO 2012030321. The dashed curve 100 represents the response of a radiofrequency transponder according to the cited document. The continuous curve 200 represents the response of a transponder according to the invention under the same measurement conditions. A gain of three dBm at 930 MHz in favour of the radiofrequency transponder according to the invention and an overall bandwidth larger than the prior art will be noted.

FIG. 9 is an overview of the process for manufacturing a radiofrequency communication module 2 according to the invention. To obtain the communication module 2 first a radiofrequency transponder 1 must be manufactured. The various sequential steps of the manufacture of the radiofrequency transponder 1 will now be described, then those of the identification patch 2. Steps related to the arts of telecommunications or of electronics have been clearly delineated from those of the assembly that may be carried out by the tyre manufacturer for example for an application to tyres.

There are three independent and successive phases.

In a first phase, corresponding to the art of telecommunications, the radiating antenna 10, which will ensure the transmission and reception of electromagnetic waves to and from the radiofrequency reader, is formed.

In one specific embodiment, the first step consists in plastically deforming a steel wire 12 of 200-micron outside diameter in order to form a helical spring using suitable industrial means such as a spring coiling machine. Thus, a continuous spring the outside diameter 15 of which is about 1.5 millimetres is obtained, this diameter being small with respect to the length 17 desired for the final radiating antenna, which is comprised between 35 and 55 mm and for example is 50 mm. A heat treatment may be applied after this plastic deformation step, for example a heat treatment at a temperature above 200° C. lasting at least 30 mn, in order to relax any prestresses in the helical spring thus formed.

The second step consists in cutting the helical spring by laser cutting to the desired length, this length corresponding to one half wavelength at the frequency of the electromagnetic communication signals, given the speed of propagation of these waves, in an elastomer medium, i.e. about 50 mm. The mechanical part thus obtained is the radiating antenna 10 according to the invention.

In a second phase, the electronic portion 20 of the radiofrequency transponder 1, which will interrogate the electronic chip 22 and send the response to the radiating antenna 10, is produced. The transmission of information between the radiating antenna 10 and the electronic portion 20 is achieved by inductive coupling using a primary antenna 24.

This electronic device, which is encapsulated in the rigid mass 29, is composed on the one hand of an electronic chip 22 and on the other hand of a primary antenna 24.

One embodiment of this electronic device is shown in the configuration in which the electronic portion 20 is intended to be located in the interior of the radiating antenna 10. In one preferred embodiment, the lead-frame process is employed to form the electro-mechanical carrier of the primary antenna 24 and of the electronic chip 22, the lead frame forming the equivalent of a printed circuit board 26. This process is particularly well suited to this configuration because it lends itself well to miniaturization.

The first step consists in forming the electronic board. To do this, firstly the electronic chip 22 is fastened to the lead frame using a conductive adhesive, for example the adhesive H20E from Tedella. Next, the chip is connected by wire bonding to the lead frame, i.e. an electrical bridge is produced between the electronic chip 22 and the printed circuit board 26 that the lead frame may be said to represent using, for example, gold wires 28 of 20-micron diameter. It is then possible to measure the electrical impedance of the electronic board at the points at which the primary antenna 24 is fastened to the lead frame using a suitable electrical device such as an impedance meter.

The second step consists in producing the primary antenna 24. Here this antenna consists of a coil of circular turns that is constructed directly on the lead frame in wire-bonding technology. To do this, a gold wire of 20-micron diameter is employed, though aluminium or palladium-coated copper wire could also have been used, to produce the half-turns of the coil on the backside of the lead frame. The diameter of each of these half-turns is 400 microns, and the ultrasound technology conventionally used in the semiconductor industry is used to electrically connect the gold wires and the lead frame. Next, on the front side of the lead frame, the other half-turns are produced in order to obtain a cylindrical coil of 15 turns of 400-micron diameter.

The number of turns of the primary antenna 24 is defined such that the electrical impedance of the primary antenna 24 is matched to the electrical impedance of the electronic board, which comprises at least the printed circuit board 26 that the lead frame may be said to represent and the electronic chip 22. In our case, the electrical impedance of the electronic chip 22 alone is a complex number that has, for example, a value of $(10-j*150)$ ohms. Thus, a coil of 15 turns of 400-micron diameter corresponds to a good match to the electrical impedance of an electronic board constructed with a copper lead frame.

The last step of production of the electronic portion 20 consists in encapsulating the lead frame and the components that are connected thereto in a rigid mass 29, using a high-temperature epoxy resin. To do this, the globtop technology will be employed. This technology consists in depositing the resin, such as the MONOPDX GE780 resin from DELO, in the liquid state, using means, such as a syringe, for sucking up and dispensing. This operation is carried out in a conventional microelectronics-industry environment such as a cleanroom. Next, the liquid resin is polymerized by way of an ultraviolet lamp that generates a temperature of at least 130° C. and that accelerates the polymerization of the resin in order to achieve a chemical reaction time of about one minute. The rigid mass 29 resulting here from this polymerization forms a capsule enclosing the lead frame and the electronic components, which may be said to represent the electronic board of the radiofrequency transponder 1.

The third phase of production of the radiofrequency transponder 1 consists in assembling the radiating antenna 10 produced in the first step with the electronic portion 20 produced in the second step.

In the first configuration in which the primary antenna 24 is intended to be located in the interior of the radiating antenna 10, the procedure is as follows.

Firstly, suitable needle-nose tweezers are used to pick up the electronic portion 20, which electronic portion is inscribed in a cylinder the diameter of which is smaller than or equal to the inside diameter 13 of the radiating antenna 10 produced in the first step, i.e. to about 1 millimetre.

The electronic portion 20 is inserted into the interior of the radiating antenna 10 so that the axis of symmetry 23 of the primary antenna is positioned in the direction of the axis of revolution 11 of the radiating antenna 10. The electronic portion 20 is then moved deeper into the radiating antenna 10, until the median plane 21 of the primary antenna coincides with the median plane 19 of the radiating antenna. Next, the electronic portion 20 is released from the needle-nose tweezers and the tweezers are delicately removed from the interior of the radiating antenna 10.

Self centring, i.e. a parallelism of the axes and a relative position of the median planes of the radiating antenna 10 and of the primary antenna 24, is thus achieved, this being favourable to the obtainment of quality inductive coupling between the two antennas.

According to one optimized embodiment, a split pin is used to facilitate the relative positioning of the radiating antenna 10 and the primary antenna 24. It is for example a question of a tubular split pin made of a flexible and electrically insulating material such as for example a rubber blend. This split pin has a slit extending along the length of the tube and cylindrical orifices located in its thickness at one of the ends thereof along the axis of the split pin. Ideally, the split pin is equipped with a mark on its external face that identifies the median plane 21 of the primary antenna, when the electronic portion 20 is housed in the interior of the split pin. This tube possesses inside and outside diameters that respectively correspond to the outside diameter circumscribed by the electronic portion 20 and to the perfectly fitted inside diameter 13 of the radiating antenna 10. The electronic portion 20 is inserted into the interior of the slit tube by moving the two halves of the split pin apart so as to open the slit. The electronic portion 20 is placed such that the axis of symmetry 23 of the primary antenna 24 is parallel to the axis of the split pin and so that the median plane 21 of the primary antenna 24 is coincident with the mark on the external face of the split pin.

Next, the split pin, picked up beforehand with a pair of long-reach tweezers the end of each jaw of which is accommodated in one of the cylindrical orifices of the split pin, is guided using the tweezers into the interior of the radiating antenna 10 in order that, on the one hand, the mark on the external face of the split pin coincides with the median plane 19 of the radiating antenna, and so that, on the other hand, the axis of the split pin is parallel to the axis of revolution 11 of the radiating antenna 10. Closing the long-reach tweezers closes the slit of the split pin, facilitating introduction of the split pin into the radiating antenna 10. Once in place, the long-range tweezers are opened, allowing the split pin to return to its initial position, and thus causing the split pin to be retained in the radiating antenna 10. It is then enough to remove the ends of the jaws of the tweezers from the orifices of the split pin and to delicately remove the tweezers.

The assembly thus formed is a radiofrequency transponder 1 that may very easily replace a conventional transponder 70 during the manufacture of a patch 2 as indicated above. It is of course necessary to adapt the cavity 61 to the dimensions of the transponder 1.

Figure 10:
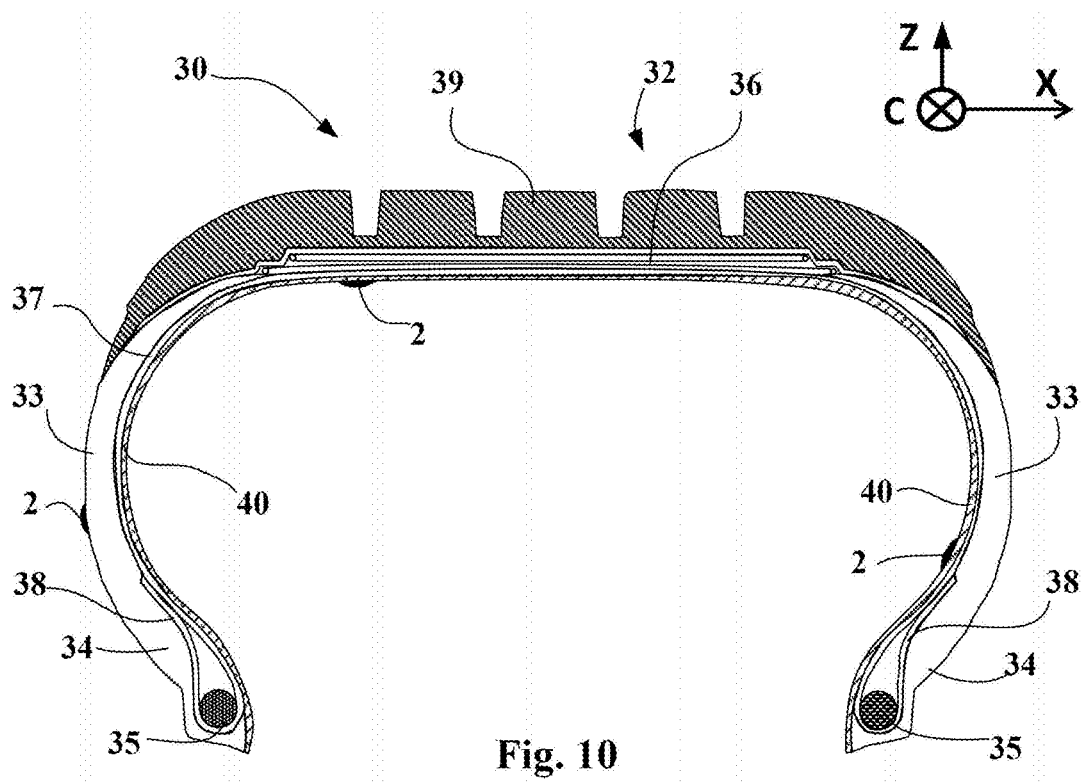
FIG. 10 illustrates in axial cross section a tyre comprising a radiofrequency module placed in its structure and a radiofrequency module fastened by adhesive bonding to its internal wall.

FIG. 10 shows an axial cross section of a tyre comprising a patch fastened to its internal wall.

FIG. 10 indicates the axial X, circumferential C and radial Z directions and also the median plane EP (plane perpendicular to the axis of rotation of the tyre which is situated halfway between the two beads 4 and passes through the middle of the crown reinforcement 6).

This tyre 30 comprises a crown 32 reinforced by a crown reinforcement or belt 36, two sidewalls 33 and two beads 34, each of these beads 34 being reinforced with a bead wire 35. The crown reinforcement 36 is surmounted radially on the outside by a rubber tread 39. A carcass reinforcement 37 is wound around the two bead wires 35 in each bead 34, the turn-up 38 of this reinforcement 37 being, for example, arranged towards the outside of the tyre 30. In a manner known per se, the carcass reinforcement 37 is made up of at least one ply reinforced by what are known as "radial" cords, for example of textile, that is to say that these cords are disposed virtually parallel to one another and extend from one bead to the other so as to form an angle of between 80° and 90° with the median circumferential plane EP. An airtight inner liner 40 extends from one bead to the other radially on the inside with respect to the carcass reinforcement 37.

The tyre 30 comprises two pre-vulcanized patches 2 that are fastened to the tyre by means of a conventional cold-vulcanizing bonding rubber, such as Gray-Gum sold by Tech International, the first to the exterior sidewall of the tyre and the other to the inner liner 40. This communication module was fastened to the tyre after its manufacture, for example in preparation for retreading of the tyre.

It is also possible to use an adhesive based on silanized polyether.

Such adhesives are based on polyoxypropylenes, methoxysilane-functionalized at the chain end:

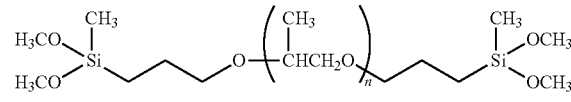

A high-weight polyoxypropylene is first functionalized with an allyl group at each of the two chain ends, then is hydrosilylated in order to ultimately obtain a methyldimethoxysilane-functional telechelic polyether.

These polymers combine relatively well the advantages of silicones (ageing resistance) and of polyurethanes (cohesion of the material). They are free of isocyanate and of solvent.

A typical formulation of an adhesive or sealant based on silanized polyether may contain, in addition to the functional polyether: filler(s), plasticizer, pigment, adhesion promoter, dehydrating agent, catalyst, thixotropic agent and optionally antioxidant and/or UV stabilizer depending on the use.

One formulation example (Kaneka DKB-5 sealant)[1] is presented in the following table:

[1] CABOT—CAB-O-SIL TS-720 in MS-Polymer Sealants (2010) phr: parts by weight per 100 parts of elastomer, in this case the silanized polyether; pcm: percentage by weight relative to 100 g of adhesive.

| Type of component | Nature of the component | phr | pcm |
|---|---|---|---|
| Silanized polyether (STPE) | S303H (Kaneka Corporation) | 100 | 33 |
| Filler | Calcium carbonate (CaCO$_3$) | 120 | 40 |
| Plasticizer | Di-iso-undecyl phthalate (DIUP) | 50 | 16.6 |
| Pigment | White titanium oxide (TiO$_2$) | 20 | 6.6 |
| Thixotropic agent | Polyamide wax or fumed silica | 5 | 1.7 |
| Dehydrating agent | Vinyltrimethoxysilane | 2 | 0.7 |
| Adhesion promoter | N-2-aminoethyl-3-aminopropyltrimethoxysilane | 3 | 1 |
| Curing catalyst | Dibutyltin bis(acetylacetonate) | 1.5 | 0.5 |
| Total | | 301.5 | 100 |

After application of the adhesive based on silanized polyether (silyl-terminated polyether or STPE), the latter polymerizes with the moisture from the air[2].

[2] CRAY VALLEY—One-component Moisture Curing Methoxysilane Sealants (2001)

This polymerization is carried out in two steps:

Step 1: Conversion of the methoxysilane to silanol by hydrolysis:

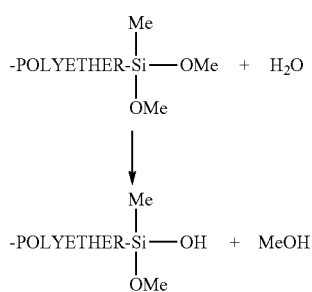

Step 2: Condensation of the silanol with a methoxysilane in order to form a siloxane bridge:

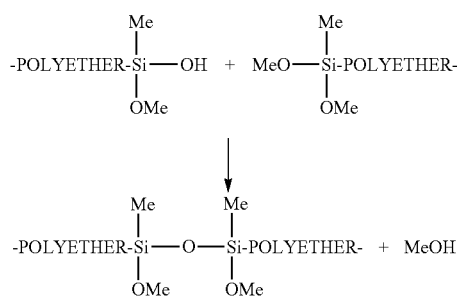

Adhesives based on silanized polyether are available commercially, especially from Bostik: BOSTIK-Simson-ISR-7003, this is a one-component adhesive.

The use of such an adhesive has the advantage of not using any solvent or any dissolution and of having much quicker crosslinking kinetics than a customary cold-vulcanizing bonding rubber layer, such as Gray-Gum supplied by Tech International, while having excellent mechanical strength. This bonding rubber requires the use of a dissolution ("vulcanization chemical fluid") which comprises a vulcanization ultra-accelerator and which has to be applied after preparation of the surfaces to be adhesively bonded.

FIG. 11 shows a radial bead 34 of a heavy goods vehicle tyre, this bead comprising a patch 2 in a particularly advantageous position. This bead comprises a carcass ply 37 with a turn-up 38, a bead wire 35, two filling rubbers 41 and 42 placed radially outside the bead wire 35 and a protector 43 placed radially under the bead wire 35 and able to make contact with a rim seat. This protector has as radially internal and axially internal end the edge referred to as the bead toe 45.

The radio frequency patch 2 is then, during a retreading operation, advantageously entirely placed in a zone the curvilinear abscissa of which is greater than 60 mm and preferably comprised between 70 and 110 mm from this bead toe 45. The patch has its longitudinal axis oriented normally to the reinforcers of the radial carcass ply 37. By entirely placed in the zone identified, what is meant is that the lower lip of the patch 2 is placed at more than 60 mm from the bead toe. By virtue of the process for manufacturing the patch, the location of the transponder and its orientation are precisely known.

The invention claimed is:

1. A process for manufacturing a rubber patch comprising a radiofrequency transponder, the patch having a first layer and a second layer, comprising the following steps:

choosing a first mould, having an impression which has a geometry adapted to a geometry of the first layer of the patch and that defines on a surface of the first layer a cavity able to receive the transponder;

placing a rubber material forming the first layer of the patch in the impression of the first mould;

raising the temperature of the first mould for a time suitable to vulcanize the rubber material to obtain a vulcanized first layer with a cavity, able to receive a radiofrequency transponder, on its exterior surface;

choosing a second mould, having an impression which has a geometry adapted to a geometry of the patch;

placing the vulcanized first layer in the impression of the second mould;

inserting the radiofrequency transponder into the cavity of the surface of the vulcanized first layer;

placing a rubber material forming the second layer of the patch into the impression of the second mould over the radiofrequency transponder;

raising the temperature of the second mould for a time suitable to at least partially vulcanize the rubber material to obtain an at least partially vulcanized rubber second layer; and removing the rubber patch, comprising the radiofrequency transponder embedded between the first and second layers, from the second mould, wherein the impression of the first mould comprises at least one rib in order to create, in the surface of the first layer between the cavity able to receive a radiofrequency transponder and an exterior end of the surface, a groove.

2. The process according to claim 1, wherein the impression of the first mould comprises four ribs in order to create, in the surface of the first layer between the cavity able to receive a radiofrequency transponder and the exterior end of the surface, four grooves extending the length and width of the surface of the first layer.

3. The process according to claim 1, wherein the rubber material from which the first layer and the rubber material from which the second layer is made is a rubber blend based on unsaturated or saturated diene elastomers.

4. The process according to claim 3, wherein the rubber material from which the first layer is made is a rubber blend based on butyl rubber.

5. The process according to claim 3, wherein the rubber material from which the second layer is made is based on unsaturated diene elastomer.

6. The process according to claim 1, wherein the rubber material of the first and second layers is based on an ethylene propylene diene monomer rubber.

7. The process according to claim 1, wherein, after the vulcanized first layer has been placed in the impression of the second mould and before the rubber material forming the second layer is placed in the second mould, the surface of the vulcanized first layer is prepared.

8. The process according to claim 7, wherein the surface of the vulcanized first layer is prepared by applying a film of solvent, by a plasma treatment, or by removing an interlayer placed on the surface of the first layer before the vulcanization thereof.

9. The process according to claim 1, wherein, after the vulcanized first layer has been obtained, the vulcanized first layer is placed in the impression of the second mould and the rubber material forming the second layer is placed in second mould within a time less than one hour.

10. The process according to claim 1, wherein the rubber material forming the first layer and the rubber material forming the second layer are formed by injection moulding.

11. The process according to claim 1, wherein the rubber material forming the first layer and the rubber material forming the second layer are formed by over moulding.

12. The process according to claim 1 further comprising the steps of:
   demoulding the vulcanized patch; and thereafter
   adding a layer of non-vulcanized bonding rubber to the exterior surface of the second layer.

13. The process according to claim 1 further comprising the steps of:
   demoulding the vulcanized patch; and thereafter
   adding an adhesive layer based on silanized polyether to the exterior surface of the second layer.

* * * * *